: US005662978A

United States Patent [19]
Brown et al.

[11] Patent Number: 5,662,978
[45] Date of Patent: Sep. 2, 1997

[54] PROTECTIVE COVER FABRIC INCLUDING NONWOVENS

[75] Inventors: J. Page Brown, Smyrna; Ty J. Stokes, Suwanee, both of Ga.

[73] Assignee: Kimberly-Clark Worldwide, Inc., Irving, Tex.

[21] Appl. No.: 522,787

[22] Filed: Sep. 1, 1995

[51] Int. Cl.$^6$ ...................................................... B32B 7/10
[52] U.S. Cl. ......................... 428/57; 114/361; 150/166; 156/73.4; 156/92; 156/244.11; 156/244.27; 428/102; 428/103; 428/198; 428/200; 428/334; 428/335; 442/362; 442/363; 442/364; 442/396; 442/398; 442/401
[58] Field of Search ........................... 114/361; 150/166; 156/73.4, 92, 244.11, 244.27; 428/102, 103, 198, 200, 290, 296, 334, 335, 336, 340, 57

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | |
| 3,502,538 | 3/1970 | Petersen | |
| 3,502,763 | 3/1970 | Hartmann | 264/210 |
| 3,542,615 | 11/1970 | Dobo et al. | 156/181 |
| 3,622,428 | 11/1971 | Robinson | |
| 3,692,618 | 9/1972 | Dorschner et al. | |
| 3,802,817 | 4/1974 | Matsuki et al. | 425/66 |
| 3,849,241 | 11/1974 | Butin et al. | |
| 3,855,046 | 12/1974 | Hansen et al. | |
| 3,932,682 | 1/1976 | Loft et al. | 428/296 |
| 4,041,203 | 8/1977 | Brock et al. | 428/157 |
| 4,340,563 | 7/1982 | Appel et al. | 264/518 |
| 4,368,232 | 1/1983 | Morioka et al. | 428/228 |
| 4,368,233 | 1/1983 | Barkes et al. | 428/245 |
| 4,374,888 | 2/1983 | Bornslaeger | 428/198 |
| 4,379,192 | 4/1983 | Wahlquist et al. | 428/156 |
| 4,594,286 | 6/1986 | McKinney et al. | 428/245 |
| 4,627,847 | 12/1986 | Puletti et al. | 604/366 |
| 4,631,933 | 12/1986 | Carey, Jr. | 66/192 |
| 4,692,161 | 9/1987 | Puletti et al. | 604/366 |
| 4,695,334 | 9/1987 | Mays | 156/62.2 |
| 4,725,473 | 2/1988 | Van Gompel et al. | 428/156 |
| 4,748,070 | 5/1988 | Beehler | 428/198 |
| 4,758,465 | 7/1988 | McKinney et al. | 428/252 |
| 4,787,699 | 11/1988 | Moulin | 350/96.21 |
| 4,847,142 | 7/1989 | Twilley et al. | 428/252 |
| 4,891,957 | 1/1990 | Strack et al. | 66/192 |
| 5,026,591 | 6/1991 | Henn et al. | 428/198 |
| 5,037,692 | 8/1991 | Miyazaki et al. | 428/252 |
| 5,108,820 | 4/1992 | Kaneko et al. | 428/198 |
| 5,108,827 | 4/1992 | Gessner | 428/219 |
| 5,149,741 | 9/1992 | Alper et al. | 525/95 |
| 5,169,706 | 12/1992 | Collier, IV et al. | 428/152 |
| 5,178,931 | 1/1993 | Perkins et al. | 428/198 |
| 5,200,443 | 4/1993 | Hudson | 524/262 |
| 5,240,756 | 8/1993 | Finell et al. | 428/45 |
| 5,252,387 | 10/1993 | Samson et al. | 428/248 |
| 5,302,454 | 4/1994 | Cecchin et al. | 428/402 |
| 5,336,552 | 8/1994 | Strack et al. | 428/224 |
| 5,368,927 | 11/1994 | Lesca et al. | 428/288 |
| 5,382,400 | 1/1995 | Pike et al. | 264/168 |
| 5,409,761 | 4/1995 | Langley | 428/198 |
| 5,534,339 | 7/1996 | Stokes | 428/284 |

FOREIGN PATENT DOCUMENTS

| | | | |
|---|---|---|---|
| 0 569 955 | 11/1898 | European Pat. Off. | |
| 0 217 032 | 4/1987 | European Pat. Off. | |
| 0 366 470 | 5/1990 | European Pat. Off. | |
| 0 400 333 | 12/1990 | European Pat. Off. | |
| 0 444 671 | 9/1991 | European Pat. Off. | |
| 0 472 946 | 3/1992 | European Pat. Off. | |
| 0 604 731 | 7/1994 | European Pat. Off. | |
| 0 674 035 | 9/1995 | European Pat. Off. | D04H 1/56 |
| WO88/01570 | 3/1988 | WIPO | |
| WO94/09193 | 4/1994 | WIPO | |
| 95 08658 | 3/1995 | WIPO | D01F 8/06 |
| 95 17867 | 7/1995 | WIPO | A61F 13/00 |

OTHER PUBLICATIONS

Patent Abstracts of Japan vol. 015, No. 475 (M–1186), 3 Dec. 1991 & JP,A,03 204340 (Nichidou Kagaku Kogyo KK), 5 Sep. 1991.

"Polymer Blends And Composites" by J. A. Manson et al., copr. 1976, pp. 273 through 277.

"Polymer Resins" by Don E. Floyd (Library of Congress Catalog No. 66–20811, Reinhold Publishing, NY, 1966).

*Primary Examiner*—James C. Cannon
*Attorney, Agent, or Firm*—James B. Robinson

[57] ABSTRACT

There is provided herein a protective cover made from conjugate fiber nonwoven fabric having a basis weight between about 1 and 8 osy laminated with a film. The conjugate fibers may be in a configuration such as sheath/core, side-by-side and islands in the sea and may be formed from polyolefins and polyamides. The preferred fiber embodiments are a side-by-side polypropylene-polyethylene fiber and a sheath/core polyethylene/nylon 6 fiber. The fabric is preferably extrusion coated with a polyethylene film to form the protective cover. The cover is light weight, waterproof and provides sufficient burst and tensile strength so that the cover may be used during transportation of, for example, a boat.

14 Claims, No Drawings

PROTECTIVE COVER FABRIC INCLUDING NONWOVENS

BACKGROUND OF THE INVENTION

Fabrics in general are used for a wide variety of applications from wipers and diapers to automobile covers. These applications call for materials having diverse properties and attributes. Some applications call for fabrics which are highly wettable, e.g. liners for diapers and feminine hygiene products, and which are soft, or are absorbent like wipers and towels, while others require strength, e.g. protective fabrics like car and boat covers, and still others require repellency and barrier properties like medically oriented fabrics for, for example, sterilization wraps and surgical gowns.

The invention disclosed herein is a protective cover for vehicles and equipment. Protective covers for various objects like cars, boats and equipment have been sold for a number of years. These covers are made from a variety of materials like canvas, nonwoven fabric laminates, polyesters, and films. They are suitable for some applications but each has at least one characteristic which, if removed, would result in a superior cover. Canvas, for example, is very heavy and cumbersome to handle, and even more so when wet. Most films are flimsy and do not hold up well to high wind conditions, to abrasion or to punctures and denting. The desired characteristics for a protective cover are light weight for ease of use, good bursting and tensile strengths, high impact resistance and resistance to water penetration. Its also desired that a protective cover avoid abrasion of the item being covered.

It is therefore an object of this invention to provide a protective cover for equipment and vehicles which is quite lightweight, waterproof and will withstand high wind conditions. It is another objective of this invention to provide a protective cover which also provides impact resistance.

SUMMARY

The objects of this invention are provided by a protective cover made from conjugate fiber nonwoven fabric having a basis weight between about 1 and 8 osy laminated with a film. The conjugate fibers may be in a configuration such as sheath/core, side-by-side, segmented pie and islands in the sea and may be formed from polyolefins and polyamides. The preferred fiber embodiments are a side-by-side polypropylene-polyethylene spunbond fiber and a sheath/core polyethylene/nylon 6 spunbond fiber. The fabric is preferably extrusion coated with a polyethylene film to form the protective cover. The cover is light weight, waterproof and provides sufficient burst and tensile strength so that the cover may even be used during transportation of, for example, a boat.

DEFINITIONS

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Levy, and U.S. Pat. No. 3,542,615 to Dobo et al. Spunbond fibers are generally not tacky when they are deposited onto a collecting surface. Spunbond fibers are generally continuous and have average diameters larger than 7 microns, more particularly, between about 10 and 25 microns.

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which may be continuous or discontinuous, are generally smaller than 10 microns in average diameter, and are generally tacky when deposited onto a collecting surface.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configuration of the material. These configurations include, but are not limited to isotactic, syndiotactic and random symmetries.

As used herein, the term "machine direction" or MD means the length of a fabric in the direction in which it is produced. The term "cross machine direction" or CD means the width of fabric, i.e. a direction generally perpendicular to the MD.

As used herein the term "monocomponent" fiber refers to a fiber formed from one or more extruders using only one polymer. This is not meant to exclude fibers formed from one polymer to which small amounts of additives have been added for coloration, anti-static properties, lubrication, hydrophilicity, ultraviolet stability, etc. These additives, e.g. titanium dioxide for coloration, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side-by-side arrangement or a segmented pie or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, through air bonding or "TAB" means a process of bonding a nonwoven bicomponent fiber web in which air which is sufficiently hot to melt one of the polymers of which the fibers of the web am made is forced through the web. The air velocity is between 100 and 500 feet per minute and the dwell time may be as long as 6 seconds. The melting and resolidification of the polymer provides the bonding. Through air bonding has restricted variability and is generally regarded as a second step bonding process. Since TAB requires the melting of at least one component to accomplish bonding, it is restricted to webs with two or more components such as bicomponent fiber webs or webs which include a heat activated adhesive.

As used herein, the term "stitchbonded" means, for example, the stitching of a material in accordance with U.S. Pat. No. 4,891,957 to Strack et al. or U.S. Pat. No. 4,631,933 to Carey, Jr.

As used herein, "ultrasonic bonding" means a process performed, for example, by passing the fabric between a sonic horn and anvil roll as illustrated in U.S. Pat. No. 4,374,888 to Bornslaeger.

As used herein "thermal point bonding" involves passing a fabric or web of fibers to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/ square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. As in well known in the art, the spot bonding holds the laminate layers together as well as imparts integrity to each individual layer by bonding filaments and/or fibers within each layer.

As used herein, the term "protective cover" means a cover for vehicles such as cars, trucks, boats, airplanes, motorcycles, bicycles, golf carts, etc., and covers for equipment often left outdoors like grills, yard and garden equipment (mowers, roto-tillers, etc.) and lawn furniture. Protective covers may be used to cover stationary items or as transportation covers, e.g. boat covers for boats mounted on trailers and towed.

TEST METHODS

Gardner Falling Weight Impact test: This test measures maximum impact force prior to damage by a four pound weight falling onto a painted metal sheet covered by the fabric to be tested. The test measures inches of height above the panel to which the half inch diameter rod with a rounded point was raised prior to impact, and a higher reading indicates a relatively more protective fabric. This test is performed according to ASTM test method D-2794-84 and the results are reported in units of in-lb. The testing reported herein was performed by Paint Research Associates of Ypsilanti, Mich.

Grab Tensile test: The grab tensile test is a measure of breaking strength and elongation or strain of a fabric when subjected to unidirectional stress. This test is known in the art and conforms to the specifications of Method 5100 of the Federal Test Methods Standard No. 191A. The results are expressed in pounds to break and percent stretch before breakage. Higher numbers indicate a stronger, more stretchable fabric. The term "load" means the maximum load or force, expressed in units of weight, required to break or rupture the specimen in a tensile test. The term "strain" or "total energy" means the total energy under a load versus elongation curve as expressed in weight-length units. The term "elongation" means the increase in length of a specimen during a tensile test. Values for grab tensile strength and grab elongation are obtained using a specified width of fabric, usually 4 inches (102 mm), clamp width and a constant rate of extension. The sample is wider than the clamp to give results representative of effective strength of fibers in the clamped width combined with additional strength contributed by adjacent fibers in the fabric. The specimen is clamped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Philadelphia, Pa. 19154, which have 3 inch (76 mm) long parallel clamps. This closely simulates fabric stress conditions in actual use.

Trap Tear test: The trapezoid or "trap" tear test is a tension test applicable to both woven and nonwoven fabrics. The entire width of the specimen is gripped between clamps, thus the test primarily measures the bonding or interlocking and strength of individual fibers directly in the tensile load, rather than the strength of the composite structure of the fabric as a whole. The procedure is useful in estimating the relative ease of tearing of a fabric. It is particularly useful in the determination of any appreciable difference in strength between the machine and cross direction of the fabric. In conducting the trap tear test, an outline of a trapezoid is drawn on a 3 by 6 inch (75 by 152 mm) specimen with the longer dimension in the direction being tested, and the specimen is cut in the shape of the trapezoid. The trapezoid has a 4 inch (102 mm) side and a 1 inch (25 mm) side which are parallel and which are separated by 3 inches (76 mm). A small preliminary cut of ⅝ inches (15 mm) is made in the middle of the shorter of the parallel sides. The specimen is clamped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Philadelphia, Pa. 19154, which have 3 inch (76 mm) long parallel clamps. The specimen is clamped along the non-parallel sides of the trapezoid so that the fabric on the longer side is loose and the fabric along the shorter side taut, and with the cut halfway between the clamps. A continuous load is applied on the specimen such that the tear propagates across the specimen width. It should be noted that the longer direction is the direction being tested even though the tear is perpendicular to the length of the specimen. The force required to completely tear the specimen is recorded in pounds with higher numbers indicating a greater resistance to tearing. The test method used conforms to ASTM Standard test D1117-14 except that the tearing load is calculated as the average of the first and highest peaks recorded rather than the lowest and highest peaks. Five specimens for each sample should be tested.

Mullen Burst test: The Mullen burst strength test gives the amount of force necessary to puncture a fabric. The Mullen burst test is carried out in accordance with ASTM D-3786 entitled Hydraulic Bursting Strength of Knitted Goods and Nonwoven Fabrics and the results are reported in pounds.

Bulk Test: The Bulk test gives the thickness of a fabric in inches. The test used herein used a 5 inch "platform".

Hydrohead: A measure of the liquid barrier properties of a fabric is the hydrohead test. The hydrohead test determines the height of water (in centimeters) which the fabric will support before a predetermined amount of liquid passes through. A fabric with a higher hydrohead reading indicates it has a greater barrier to liquid penetration than a fabric with a lower hydrohead. The hydrohead test is performed according to Federal Test Standard No. 191A, Method 5514.

Melt Flow Rate: The melt flow rate (MFR) is a measure of the viscosity of a polymers. The MFR is expressed as the weight of material which flows from a capillary of known dimensions under a specified load or shear rate for a measured period of time and is measured in grams/10 minutes at 230° C. according to, for example, ASTM test 1238, condition E.

Cold Cracking Test: The cold cracking test measures how well a fabric withstands cold temperatures. The test is also referred to as the Gruel Rotary Cold Fold Method and is carried out according to ASTM D1912 at 0° C. and −30° C.

DETAILED DESCRIPTION OF THE INVENTION

Provided herein is a protective cover for many applications in diverse fields of use. For example, consumers may use this cover for boat covers, car covers, airplane covers and as a cover for equipment normally stored outdoors, like grills, lawn care equipment etc. The cover could also be used to protect military equipment like tanks and artillery pieces from the elements. The protective cover herein disclosed is also suitable for covering oil processing equipment like pumps, compressors and valves.

The protective cover herein disclosed has the added advantage of being suitable for transport of the covered item without damage to the cover or the item covered. While many covers are not sufficiently strong for transportation use, the cover of this invention is. This avoids having to change covers when an item is going to be moved and avoids the purchase of two types of covers; one for storage and one for transport. This results in a great time and money savings for the user.

In addition, since the cover of this invention is quite light and thin, it is more likely to be used and not simply stored, and so will provide protection for a greater period of time than a heavy, bulky, hard to use cover.

The protective cover of this invention is a novel laminate of a nonwoven fabric and a film, either of which may be multilayered. The nonwoven fabric may be a monocomponent, conjugate or multiconstituent web although conjugate fibers are preferred. The film is preferably a polyolefin film, particularly polyethylene.

The fibers from which nonwoven the fabric of this invention is made may be produced by the meltblowing or spunbonding processes which are well known in the art, though spunbonding is preferred. These processes generally use an extruder to supply melted thermoplastic polymer to a spinneret where the polymer is fiberized to yield fibers which may be staple length or longer. The fibers are then drawn, usually pneumatically, and deposited on a foraminous mat or belt to form the nonwoven fabric. The fibers produced in the spunbond and meltblown processes are microfibers as defined above. Conjugate fibers are produced using separate extruders for the polymers, which usually number two. Methods of making conjugate fibers are taught in U.S. Pat. No. 5,382,400 to Pike et al. which is assigned to the same assignee as this application, and which is incorporated by reference in its entirety.

The nonwoven fabric component of this invention may be multilayer laminate though it is preferred that it not be since the inventors currently see no advantage to additional layers. In fact, the weight of the cover would be adversely affected unless the total nonwoven weight were held constant. However, should a multilayer nonwoven be used one such example is an embodiment wherein some of the layers are spunbond and some meltblown such as a spunbond/meltblown/spunbond (SMS) laminate as disclosed in U.S. Pat. No. 4,041,203 to Brock et al., U.S. Pat. No. 5,169,706 to Collier, et al, and U.S. Pat. No. 4,374,888 to Bornslaeger. Such a laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 6 to about 400 grams per square meter (gsm) or approximately 0.1 to 12 ounces per square yard (osy).

The nonwoven fabric component of this invention is preferably spunbond material and preferably between about 1 and 8 osy (34 gsm to 272 gsm). The polymers which may be used to produce the spunbond component are extrudable compositions of thermoplastic polymers such as polyolefins, polyamides, polyethylene terephathalate and polyesters. Of the polyolefins, polyethylene and polypropylene are preferred. One preferred structure of such fibers is as a conjugate spunbond fiber of two polymers wherein one of the polymers is a polyolefin and the other a polyamide. Another preferred structure is a side-by-side conjugate spunbond fiber of polypropylene and polyethylene. It is also possible for one or all of the conjugate fiber extruders to extrude a biconstituent blend or alloy fiber made of more than one polymer.

Many polyolefins are available for fiber production, for example polyethylenes such as Dow Chemical's ASPUN® 6811A linear low density polyethylene, 2553 LLDPE and 25355 and 12350 high density polyethylene are such suitable polymers. The polyethylenes have melt flow rates, respectively, of about 26, 40, 25 and 12. Fiber forming polypropylenes include Exxon's PD 3445 polypropylene and Himont Chemical Co.'s PF-304. Many other polyolefins are commercially available.

The polyamide which may be used in the practice of this invention may be any polyamide known to those skilled in the art including copolymers and mixtures thereof. Examples of polyamides and their methods of synthesis may be found in "Polymer Resins" by Don E. Floyd (Library of Congress Catalog number 66-20811, Reinhold Publishing, N.Y., 1966). Particularly commercially useful polyamides are nylon-6, nylon 6,6, nylon-11 and nylon-12. These polyamides are available from a number of sources such as Nyltech North America of Manchester, N.H., Emser Industries of Sumter, S.C. (Grilon® & Gallamid® nylons) and Atochem Inc. Polymers Division, of Glen Rock, N.J. (Rilsan® nylons), among others.

In addition, a compatible tackifying resin may be added to the extrudable compositions described above to provide tackified materials that autogenously bond. Any tackifier resin can be used which is compatible with the polymers and can withstand the high processing (e.g., extrusion) temperatures. If the polymer is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ® and ARKON® P series tackifiers are examples of hydrogenated hydrocarbon resins. ZONATAC®501 lite is an example of a terpene hydrocarbon. REGALREZ® hydrocarbon resins are available from Hercules Incorporated. ARKON® P series resins are available from Arakawa Chemical (USA) Incorporated. The tackifying resins such as disclosed in U.S. Pat. No. 4,787,699, hereby incorporated by reference, are suitable. Other tackifying resins which are compatible with the other components of the composition and can withstand the high processing temperatures, can also be used.

It is also possible to have other materials blended in minor amounts with the polymers used to produce the nonwoven and/or film layer according to this invention like fluorocarbon chemicals to enhance chemical repellency which may be, for example, any of those taught in U.S. Pat. No. 5,178,931, fire retardants, ultraviolet radiation resistance improving chemicals and pigments to give each layer the same or distinct colors. Fire retardants and pigments for spunbond and meltblown thermoplastic polymers are known in the art and are internal additives. A pigment, e.g. $TiO_2$, if used, is generally present in an amount less than 5 weight percentage of the layer while other materials may be present in a cumulative amount less than 25 weight percent.

Ultraviolet radiation resistance improving chemical may be, for example, hindered amines and other commercially available compounds. Hindered amines are discussed in U.S. Pat. No. 5,200,443 to Hudson and examples of such amines are Hostavin TMN 20 from American Hoescht Corporation of Somerville, N.J., Chimassorb® 944 FL from the Ciba-Geigy Corporation of Hawthorne, N.Y., Cyasorb UV-3668 from American Cyanamid Company of Wayne, N.J. and Uvasil-299 from Enichem Americas, Inc. of New York.

Items made from the laminates of this invention may also have topical treatments applied to them for more specialized functions. Such topical treatments and their methods of application are known in the art and include, for example, alcohol repellency treatments, anti-static treatments and the like, applied by spraying, dipping, etc. An example of such a topical treatment is the application of Zelec® antistat (available from E.I. dupont, Wilmington, Del.).

Specific combinations for the conjugate fiber and film laminate include polypropylene/nylon side-by-side spunbond fibers with polypropylene film, polyethylene/nylon side-by-side spunbond fibers with polyethylene film, polypropylene/nylon side-by-side spunbond fibers with EVA film, polyethylene/nylon sheath/core spunbond fibers with polyethylene film, polypropylene/nylon sheath/core spunbond fibers with polypropylene film, polypropylene/polyethylene side-by-side spunbond fibers with polypropylene film, polypropylene/polyethylene side by side fibers with polyethylene film, polyethylene/polypropylene sheath/core with a polyethylene film.

The film component layer may be extruded using any method known in the art to be effective. The film component is produced in a thickness of from about 0.5 mils to about 8 mils, or more particularly about 2 to 4 mils and may be made from any number of layers as long as the total thickness is within these indicated ranges.

The film may be made from those polymers commonly known to be useful in the production of films, particularly ethylvinyl acetate (EVA), polyvinlychloride (PVC), polyamides and polyolefins with polyolefins being preferred. Among polyolefins, polypropylene and polyethylene are preferred. The film compositions of this invention are relatively simple as the inventors have found that such compositions give good adhesion to conjugate fiber webs without resorting to relatively more complicated formulations, and are simple to process and are relatively inexpensive. The formulations of, for example, U.S. Pat. No. 4,368,232 are not desired in the practice of this invention.

The film layer may also be made from polymers which are semicrystalline/amorphous or heterophasic in character. Suitable heterophasic polymers are disclosed in European Patent Application EP 0444671 A3 (based on Application number 91103014.6), European Patent Application EP 0472946 A2 (based on Application number 91112955.9), European Patent Application EP 0400333 A2 (based on Application number 90108051.5), U.S. Pat. No. 5,302,454 and U.S. Pat. No. 5,368,927. Heterophasic polymers are available commercially under the trade designation "Catalloy" from the Himont Chemical Company of Wilmington, Del., and polypropylene. Specific commercial examples are Catalloy® KS-084P, Cataloy® KS-085 and Catalloy® KS-057P. The film layer may also have small amounts of additives present to improve processibility such as low density polyethylene (LDPE) like those available from Quantum Chemical Company under the designation NA 334 or those available from Rexene under the designation 1058 LDPE. Many similar LDPE polymers are commercially available.

The film and nonwoven fabric may also be adhesively bonded together by using commercial adhesives which are known to those skilled in the art. Examples include the adhesive of U.S. Pat. No. 5,149,741, hereby incorporated by reference, to Alper et al. and assigned to Findley Adhesives, Inc., of Wauwatosa, Wis.. This coating is an adhesive which comprises about 15 to 40 parts of a styrene-isoprene-styrene block copolymer wherein the styrene content of the copolymer is 25 to 50 weight percent, about 40 to 70 parts of a compatible tackifying resin such as, for example, pentaerythritol esters, about 5 to 30 parts of a napthenic/ paraffinic oil and 0.1 to 2 parts, by weight, of a phosphite antioxidant, hindered phenolic antioxidant and a stabilizer, where the adhesive has a melt viscosity of not greater than 6000 cP at 325° F.

Alternatively, the film may be formed directly onto the nonwoven web and cured in contact with it. This method ensures that the contact between the two components is intimate and that the adhesion between the two is strong, particularly if the same polymer is present in both components as is preferred. This method, know as extrusion coating, involves extruding the polymer as a film directly onto the nonwoven and then passing the film coated nonwoven through a "nip" or roller arrangement where the film and nonwoven are squeezed together to for a strong bond. The pressure of the nip may be controlled to vary the force used to squeeze the two components together.

The film may also be attached to the nonwoven layer by other means such as stitchbonding and ultrasonic bonding.

The fabric of this invention may be produced in standard commercial widths. These standard commercial widths may be joined together at seams to produce protective covers of specific configurations to exactly fit particular vehicles. The seams may be joined by using a heat-sealable polymer tape such as a polyethylene coated scrim, a polypropylene coated scrim, an EVA coated scrim or a PVC tape as are known in the art. The tape is placed over the edges of both pieces of fabric and heated to a temperature which will cause the polymer to adhere to both pieces. This temperature has been found to be between about 600° and 650° F. for polyethylene, between about 550° and 675° C. for EVA and about 1000° C. for PVC. It has also been found that the fabric of this material itself may be used as a sealing tape. This is not the case with the PVC/nonwoven fabrics because of the adhesive layer used to join the two. The seams may also be joined by conventional stitching or by ultrasonic bonding.

A number of examples were prepared using various polymers. Descriptions of the Examples and competitive fabrics are provided below and the results of the testing of these examples as well as the commercially available competitive materials are provided below in Table 1. All fabrics passed the Cold Cracking test.

EXAMPLE 1

This material is a 3 osy (102 gsm) side-by-side polyethylene polypropylene conjugate spunbond fiber web onto which was extruded a 4 mil polyethylene film. The fiber polymers were Exxon PD 3445 polypropylene and Dow's ASPUN® 6811 A polyethylene. The film polymer was Rexene 5080. The film had additives in minor amounts for ultraviolet resistance and color. The nip pressure was 40 pounds.

EXAMPLE 2

This material is a 2.5 osy sheath/core polyethylene/nylon 6 conjugate spunbond fiber web onto which was extruded a 1 mil polyethylene film. The fiber polymers were Dow's ASPUN® 6811 A polyethylene and Nyltech nylon 6 from Nyltech North America. The film polymer was Rexene 5080. The film had additives in minor amounts for ultraviolet resistance and color. The nip pressure was 60 pounds.

EXAMPLE 3

This material is a 3 osy side-by-side polyethylene polypropylene conjugate spunbond fiber web onto which was extruded a 4 mil film. The fiber polymers were Exxon PD 3445 polypropylene and Dow's ASPUN® 6811 A polyethylene. The film polymer was Quantum Chemical's UG-635 ethylvinyl acetate. The film had additives in minor amounts for ultraviolet resistance and color. The nip pressure was 40 pounds.

EXAMPLE 4

This material is a 3 osy polypropylene spunbond fiber web onto which was extruded a 4 mil film. The fiber polymer was Exxon PD 3445 polypropylene. The film was a heterophasic polymer available from Himont Chemical under the trade designation Catalloy KS-085. The film had additives in minor amounts for ultraviolet resistance and color. The nip pressure was 40 pounds.

EXAMPLE 5

This material is a 3 osy polypropylene spunbond fiber web onto which was extruded a 4 mil film. The fiber polymer was Exxon PD 3445 polypropylene. The film was a polypropylene available from Rexene. The film had additives in minor amounts for ultraviolet resistance and color. The nip pressure was 40 pounds.

EXAMPLE 6

This material is a 4 osy (136 gsm) side-by-side polyethylene/polypropylene conjugate spunbond fiber web onto which was extruded a 4 mil polyethylene film. The fiber polymers were Exxon PD 3445 polypropylene and Dow's ASPUN® 6811 A polyethylene. The film polymer was Rexene 5080. The film had additives in minor amounts for ultraviolet resistance and color. The nip pressure was 60 pounds.

EXAMPLE 7

This material is a 4 osy side-by-side polyethylene polypropylene conjugate spunbond fiber web onto which was extruded a 4 mil polyethylene film. The fiber polymers were Exxon PD 3445 polypropylene and Dow's ASPUN® 6811 A polyethylene. The film polymer was Rexene 5080. The film had additives in minor amounts for ultraviolet resistance and color. The nip pressure was 40 pounds.

EXAMPLE 8

This material is a 2.5 osy (85gsm) sheath/core polyethylene/nylon 6 conjugate spunbond fiber web onto which was extruded a 4 mil polyethylene film. The fiber polymers were Dow's ASPUN® 6811 A polyethylene and Nyltech nylon 6 from Nyltech North America. The film polymer was Rexene 5080. The film had additives in minor amounts for ultraviolet resistance and color. The nip pressure was 40 pounds.

COMPETITIVE 1

This material is a 13.7 osy (465 gsm) composite having a polyester nonwoven fiber web and a PVC film thereon. This material is available commercially from the Haartz Crop., 87 Hayward, Rd., Acton, Ma. 01720-3000 and is believed to have a 50/50 weight ration of film and fiber which are adhesively bonded together.

COMPETITIVE 2

This material is a 10.4 osy (353 gsm) composite having a polyester nonwoven fiber web and a PVC film thereon. This material is available commercially as a transportation cover from the Marine Specialties Group, a subsidiary of G&T Industries, 475 36th St., Grand Rapids, Mich. 49548.

COMPETITIVE 3

This material is a relatively thick polypropylene film having a basis weight of 4.4 osy (149 gsm) and has a thickness of about 15 mils.

a heavy cover often goes unused because of the difficulty of putting it in place and removing it from a vehicle or piece of equipment. The invention described herein is relatively light weight, preferably less than 8 osy and still more preferably between about 2 and 5 osy. The fabric is waterproof yet provides sufficient tensile and burst strength to be functional for a long time. In particular, the fabric of this invention provides a burst strength above about 55 pounds, which is sufficient for a cover used for storage and also for a cover used to protect something, e.g., a boat, during transport. Example 8 provides a burst strength above about 100.

It has also been found that a particular embodiment, using a sheath-core polypropylene-nylon fabric provides surprisingly superior impact resistance and so will protect an item much better than other fabrics. This is particularly advantageous when the cover of this invention is used, for example, as a car cover in an area where the vehicle may be "dinged" by the doors of adjacent vechicles. The inventors are at present unaware of the method of functioning of this impact resistance protective mechanism. The impact resistance of various fabric materials is given in Table 2. The impact resistance reported in Table 2 is the Gardner Impact Resistance Test pass weight in pounds normalized by dividing by the fabric's basis weight and thickness and then multiplying by 10,000.

TABLE 2

| Fabric | Impact resistance | Basis weight (osy) |
|---|---|---|
| Uncovered | 0 | 0 |
| Polypropylene spunbond | 30 | 1 |
| Nylon fabric | 38 | 1.5 |
| PP/Nylon sheath/core spunbond | 50 | 1 |
| Cotton flannel | 2 | 8.1 |
| Poly-cotton | 3 | 3.9 |
| Sunbrella ® fabric | 2 | 8.7 |

TABLE 1

| TEST DATA: | COMPETITIVE FABRICS | | | EXAMPLES | | | | | | | |
|---|---|---|---|---|---|---|---|---|---|---|---|
| | 1 | 2 | 3 | 1 | 2 | 3 | 4 | 5 | 6 | 7 | 8 |
| FABRIC: | | | | | | | | | | | |
| Film (mil) | PVC | PVC | PP | 4 PE | 1 PE | 4 EVA | 4 Heterophas. | 4 PP | 4 PE | 4 PE | 4 PE |
| Nonwoven (osy) | Polyester | Polyester | none | 3 PE-PP | 2.5 PE-PP | 3 PE-PP | 3 PP | 3 PP | 4 PE-PP | 4 Prism | 2.5 PE-NYL |
| Basis Wts (osy) | 13.7 | 10.4 | 4.4 | 5.6 | 3.7 | 6.2 | 5.8 | 5.4 | 7.8 | 7.4 | 6.3 |
| GRAB TENSILE: | | | | | | | | | | | |
| CD Load | 199.4 | 145.4 | 39.9 | 51.3 | 72.3 | 55 | 72 | 65.4 | 80.1 | 78.3 | 84.0 |
| CD % Strain | 113.5 | 112.6 | 502.2 | 76.9 | 108.8 | 93.6 | 82.8 | 43 | 93.4 | 91.2 | 93.7 |
| CD Energy | 32.4 | 279.1 | 498 | 79.6 | 130 | 105.2 | 122.8 | 58.1 | 158.1 | 148.8 | 146.2 |
| MD Load | 153.8 | 164.5 | 40.7 | 56.3 | 111 | 58.5 | 78.6 | 75.3 | 101.8 | 86.30 | 118.0 |
| MD % Strain | 100.2 | 136.6 | 402 | 66 | 89.6 | 73.8 | 63.0 | 40.5 | 78.6 | 83.2 | 77 |
| MD Energy | 235.6 | 362.2 | 417 | 75.2 | 176.5 | 87.7 | 104.3 | 64.9 | 169.6 | 147.6 | 170.7 |
| Trap-Tear: | | | | | | | | | | | |
| CD - Avg | 70.8 | 52.2 | 7.3 | 13.1 | 15.2 | 11.2 | 12.7 | 11 | 14.7 | 18.05 | 11.7 |
| MD - Avg | 49.2 | na | na | 12.5 | 29 | 12.6 | 14.2 | 13.6 | 18.9 | 19 | 23 |
| Bulk | 0.127 | 0.049 | 0.014 | 0.04 | 0.019 | 0.036 | 0.024 | 0.02 | 0.077 | .059 | .019 |
| Mullen Burst | >200 | 180 | >200 | 57.4 | 102 | 61.8 | 88 | 92.4 | 83 | 80.6 | 103 |

Thus it can be seen from the data in Table 1 that the protective covers of this invention are much lighter than most competitively available products, yet provide good tensile and bursting strength. The inventors believe that the competitive fabrics deliver unnecessarily high burst and tensile strength at the cost of being extremely heavy. Such The last fabric listed in Table 2 is Sunbrella® fabric from Glen Raven Mills Inc. of Glen Raven, N.C. Sunbrella® fabric is a modified acrylic or "modacrylic", woven fabric. The fibers are believed to be made from copolymers of acrylonitrile and a halogen containing monomer. The Sunbrella® fabric is topically treated with a fluorocarbon compound. The material tested was of about 8.7 osy (295 gsm).

The results show that the PP/Nylon 6 sheath core fiber gives surprisingly good impact resistance and is 25 to 40 percent more effective at protecting a covered surface from impacts than either polymer individually. The reason for this result is not currently known to the inventors.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A protective cover comprising a thermoplastic polymer-comprising conjugate fiber nonwoven fabric having a basis weight between about 1 and 8 osy, laminated by extrusion to a film having at least one layer and having a thickness between about 0.5 and 8 mils.

2. The protective cover of claim 1 wherein said conjugate fiber is a spunbond fiber comprised of at least two polymers extruded from separate extruders in a configuration selected from the group consisting of sheath/core, side-by-side and islands in the sea.

3. The protective cover of claim 2 wherein at least one polymer of said conjugate fiber is comprised of a biconstituent polymer blend.

4. The protective cover of claim 1 wherein said conjugate fiber is produced from polymers selected from the group consisting of polyolefins and polyamides.

5. The protective cover of claim 4 wherein said conjugate fiber is produced from polyolefins and said polyolefins are polypropylene and polyethylene.

6. The protective cover of claim 4 wherein said conjugate fiber is produced from polyolefins and polyamides and said polyolefin is polyethylene.

7. The protective cover of claim 4 wherein said conjugate fiber is produced from polyolefins and polyamides and said polyolefin is polypropylene.

8. The protective cover of claim 1 wherein said film is a single layer made from a polymer selected from the group consisting of polyolefins, heterophasic polymers and EVA.

9. The protective cover of claim 8 wherein said film is made from a polyolefin and said polyolefin is polyethylene.

10. The protective cover of claim 1 wherein said film is adhered to said nonwoven fabric by a method selected from the group consisting of adhesive bonding, stitchbonding, extrusion coating bonding and ultrasonic bonding.

11. A protective cover comprising a polyethylene-polypropylene side-by-side conjugate spunbond fiber web having a basis weight between about 2 and 5 osy onto which has been extruded a polyethylene film having a thickness between about 0.5 and 5 mils to form a laminate, wherein said laminate has a burst strength above about 55 pounds, is waterproof, and wherein said laminate is a protective cover having heat-sealable seams, for vehicles and equipment.

12. The protective cover of claim 11 wherein said cover in a configuration useful to protect a boat.

13. The protective cover of claim 11 wherein said cover in a configuration useful to protect a car.

14. A protective cover consisting essentially of a polyethylene/nylon sheath core conjugate spunbond fiber web having a basis weight between about 2 and 4 osy onto which has been extruded a polyethylene film having a thickness between about 0.5 and 5 mils to form a laminate, wherein said laminate has a burst strength above about 100 pounds, is waterproof, and provides impact resistance at least 50 percent greater than polypropylene spunbond fabric, and wherein said laminate is a protective cover having heat-sealable seams for vehicles and equipment.

* * * * *

UNITED STATES PATENT AND TRADEMARK OFFICE
CERTIFICATION OF CORRECTION

PATENT NO. : 5,662,978

DATED : September 2, 1997

INVENTOR(S): Brown et al.

It is certified that errors appear in the above-identified patent and that said Letters Patent is hereby corrected as shown below:

Column 1, line 31, "Its" should read --It's--;
Column 3, line 54, "am" should read --are--;
Column 4, line 38, "in" (1st occurrence) should read --is--
Column 6, line 52, "nonwoven the" should read --the nonwoven--;
Column 7, line 11, "Bomslaeger" should read --Bornslaeger--;
Column 7, line 55, "Gallamid®" should read --Grilamid®--;
Column 9, line 18, "Cataloy®" should read --Cattalloy®--;
Column 9, line 31, "Wl.." should read --Wl.--;
Column 11, Table 1, line 49, "498" should read --490--;
Column 11, Table 1, line 55, "70.8" should read --70.0--;
Column 12, line 18, "vechicles' should read --vehicles--.

Signed and Sealed this

Sixth Day of October, 1998

Attest:

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO.   : 5,662,978
DATED        : September 2, 1997
INVENTOR(S): J. Page Brown It is certified that error appears in the above-identified patent and that said Letters Patent is hereby corrected as shown below:

On the title page, item [73], "Irving, Tex." should read --Neenah, Wis.--.

Signed and Sealed this

Seventeenth Day of August, 1999

Attest:

Q. TODD DICKINSON

*Attesting Officer*        *Acting Commissioner of Patents and Trademarks*